United States Patent [19]
Mumallah et al.

[11] Patent Number: 4,884,636
[45] Date of Patent: Dec. 5, 1989

[54] DELAYING THE GELATION OF WATER SOLUBLE POLYMERS

[75] Inventors: Naim A. Mumallah; Ahmad Moradi-Araghi, both of Bartlesville, Okla.

[73] Assignee: Phillips Petroleum Company, Bartlesville, Okla.

[21] Appl. No.: 279,489

[22] Filed: Dec. 1, 1988

Related U.S. Application Data

[62] Division of Ser. No. 10,507, Feb. 3, 1987, Pat. No. 4,822,842.

[51] Int. Cl.$^4$ ............................................. E21B 33/138
[52] U.S. Cl. ..................................... 166/295; 166/300; 523/130
[58] Field of Search ............... 166/270, 294, 295, 300; 523/130

[56] References Cited

U.S. PATENT DOCUMENTS

| | | | |
|---|---|---|---|
| 3,373,814 | 3/1968 | Eilers et al. | 166/33 |
| 3,502,149 | 3/1970 | Pence, Jr. | 166/294 X |
| 3,677,987 | 7/1972 | Pence, Jr. | 260/296 |
| 3,795,276 | 3/1974 | Eilers | 166/295 |
| 3,876,438 | 4/1975 | Friedman et al. | 166/294 X |
| 3,926,258 | 12/1975 | Hessert et al. | 166/294 |
| 4,039,029 | 8/1977 | Gall | 166/294 |
| 4,191,657 | 3/1980 | Swanson | 252/8.55 |
| 4,240,505 | 12/1980 | Swanson | 166/302 |
| 4,244,826 | 1/1981 | Swanson | 166/307 X |
| 4,485,875 | 12/1984 | Falk | 166/270 X |
| 4,503,912 | 3/1985 | Norton | 166/295 |
| 4,622,356 | 11/1986 | Jarovitzky | 524/346 |
| 4,644,020 | 2/1987 | Stahl | 523/130 X |
| 4,716,966 | 1/1988 | Shu | 166/295 |
| 4,746,687 | 5/1988 | Ryles et al. | 166/295 X |
| 4,776,398 | 10/1988 | Chu et al. | 166/295 X |
| 4,785,028 | 11/1988 | Hoskin et al. | 166/295 X |
| 4,788,228 | 11/1988 | Ryles | 166/295 X |

FOREIGN PATENT DOCUMENTS 115836 1/1984 European Pat. Off. .

Primary Examiner—George A. Suchfield
Attorney, Agent, or Firm—H. B. Woodrow

[57] ABSTRACT

A process is disclosed for delaying the rate at which water soluble polymers are gelled by an aldehyde and a phenolic compound and for increasing the mechanical strength of these gels which comprises contacting an aqueous solution of said water soluble polymer, aldehyde, phenolic compound, and water with from 0.004 to about 0.049 wt % of a transition metal ion. In addition, novel gelable compositions are disclosed.

10 Claims, No Drawings

DELAYING THE GELATION OF WATER SOLUBLE POLYMERS

This application is a division of application Ser. No. 010,507, filed Feb. 3, 1987, now U.S. Pat. No. 4,822,842.

The present invention relates to a process for delaying the rate at which water soluble polymers are gelled by organic crosslinking agents. Another aspect of the invention relates to a process for increasing the mechanical strength of gelled water soluble polymers. A further aspect of the invention relates to novel compositions of gelable water soluble polymers.

It is well known to those skilled in the art that gelled water soluble polymers are useful in enhanced oil recovery operations. They have been used to alter the permeability of underground formations in order to enhance the effectiveness of water flooding operations.

The polymers, along with an appropriate crosslinking agent are injected in an aqueous solution into the formation. They percolate into and gel in the regions having the highest water permeability. Any fluids injected into the formation in subsequent flooding operations, will then be diverted away from the gels into regions of the formation having a lower water permeability.

Although this technique is effective in enhancing hydrocarbon production, it does have problems. The primary one being that the water soluble polymers gel fairly quickly after being injected into the formation. Quite often only the regions near the well bore are treated, since the polymers gel before they have an opportunity to permeate throughout the entire formation.

Numerous attempts have been made to delay the rate at which these polymers gel. Thus, Hessert et al in U.S. Pat. No. 3,926,258, assigned to Phillips Petroleum Company, disclose a method for delaying the rate of which such water soluble polymers are gelled by use of inorganic crosslinking agents.

Although a method has been discovered for delaying the rate at which inorganic crosslinking agents gel water soluble polymers, a method for delaying the effects of organic crosslinking agents has not been discovered.

Another problem associated with treating underground formations with gelled water soluble polymers, is the duration of the plug created by the gel and the corresponding increase in hydrocarbon production. These gelled polymer plugs are exposed to numerous mechanical forces within the formation which tend to promote the breakdown of the plug. When the plug breaks down, hydrocarbon production decreases, which necessitates retreating the formation with more water soluble polymers.

Thus, it would be a valuable contribution to the art to have a process which would delay the rate at which organic crosslinking agents effect the gelatin of water soluble polymers.

It would also be a valuable contribution to the art to have a process which would increase the mechanical strength of water soluble polymers which are gelled by organic crosslinking agents.

It is thus an object of the present invention to provide a process for delaying the rate at which water soluble polymers are gelled by organic crosslinking agents.

It is a further object of the present invention to provide a process for increasing the mechanical strength of water soluble polymers which have been gelled by organic crosslinking agents.

It is yet another object of the present invention to provide novel compositions of water soluble polymers which have a delayed rate of gelation.

Other aspects and objects of this invention will become apparent hereinafter as the invention is more fully described in the following disclosure and appended claims.

In accordance with the present invention, it has been discovered that the rate at which water soluble polymers are gelled by organic crosslinking agents can be delayed, when the water soluble polymer and the organic crosslinking agent are contacted with less than 0.05 wt % of a metal ion in an aqueous environment.

Further, in accordance with the present invention it has been discovered that gels of water soluble polymers which have been gelled in an aqueous environment by an organic crosslinking agent in the presence of less than 0.05 wt % of a metal ion, have improved mechanical strength.

Further, in accordance with the present invention there is provided novel gelable compositions comprising water soluble polymers, water, an organic crosslinker, and a metal ion which has a delayed rate of gelation and improved mechanical strength within a formation.

As used in this application, the term water soluble polymer or polymer refers to those polymers which are truly water soluble or those which are dispersible in water or other aqueous medium to form a stable colloidal suspension which can be pumped into a formation and gelled therein.

The water soluble polymers which are suitable for use in the present invention include those which contain from 5 to 100 mole percent of at least one monomer of the formula

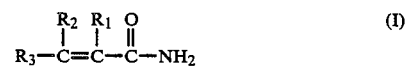

wherein $R_1$, $R_2$, and $R_3$ are selected from the group consisting of hydrogen or alkyl groups containing from 1 to 3 carbon atoms, of which acrylamide and methacrylamide are the preferred examples; and from 0 to 95 mole percent of at least one monomer selected from the group consisting of;

(A) those monomers represented by the formula:

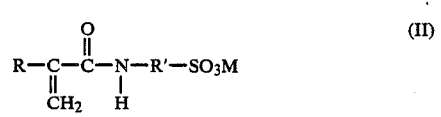

wherein R is selected from the group consisting of hydrogen or alkyl radicals containing from 1 to 6 carbon atoms, R' is selected from the group consisting of alkylene radicals containing from 1 to 6 carbon atoms or an arylene radical containing from 6 to 10 carbon atoms, and M is selected from the group consisting of hydrogen, ammonium, potassium, or sodium, of which 2-acrylamido-2-methylpropane sulfonic acid or sodium 2-acrylamido-2-methylpropane sulfonate are the preferred examples; or (B) monomers represented by the formula

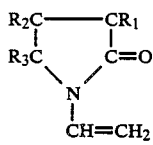

where $R_1$, $R_2$ and $R_3$ are independently selected from the group consisting of hydrogen or alkyl radicals containing from 1 to 2 carbon atoms of which N-vinyl-2-pyrrolidone is the preferred example; or (C) at least one monomer selected from the group consisting of acrylic acid, methacrylic acid, vinylsulfonic acid, vinylbenzylsulfonic acid, vinyl acetate, acrylonitrile, methyl acrylonitrile, vinyl alkyl ether, vinyl chloride, maleic anhydride, vinyl substituted cationic quaternary ammonium compounds, (acryloyloxyethyl)diethylmethylammonium methyl sulfide, sodium acrylate; or (D) mixtures thereof.

The polymerization of any of the above-described monomers and their resulting polymers are well known to those skilled in the art. There are numerous references which disclose methods of polymerizing these monomers. For example, see U.S. Pat. No. 4,244,826 or European patent application No. 0115836.

The manner in which these monomers are polymerized into water soluble polymers or the resulting polymer is not critical to the practice of the present invention.

The molecular weight of the water soluble polymers utilized in the present invention is not critical. It is presently preferred, however, that the polymer have a molecular weight of at least about 100,000 and more preferably 100,000 to 20,000,000. The upper limit is not critical as long as the polymer is still water dispersible and can be pumped into the formation.

The presently preferred class of water soluble polymers are those selected from the group consisting of homopolymers of acrylamide, homopolymers of methacrylamide, copolymers of acrylamide and sodium acrylate, copolymers of acrylamide and sodium 2-acrylamido-2-methylpropane sulfonate, copolymers of acrylamide and N-vinyl-2-pyrrolidone, and terpolymers of acrylamide, N-vinyl-2-pyrrolidone, and sodium 2-acrylamido-2-methylpropane sulfonate. The ratio of the monomers in the above-described polymers is not critical; provided however, that at least 5 mole % of acrylamide is present in the above-described polymers.

The organic crosslinking agents of the present invention are formed from: (A) a water dispersible aldehyde, and (B) a phenolic compound.

As a general guide, the amount of aldehyde used in preparing the gelled compositions of the invention will be in the range of from about 0.03 to 1.2 wt %, preferably from 0.04 to about 1 wt % based on the total weight of the composition. The amount of phenolic compound used will be in the range of from about 0.01 to 2 wt %, preferably from about 0.04 to about 1 wt % based on the total weight of the composition. The molar ratio of aldehyde to phenolic compound will be in the broad range of from about 0.1:1 to 25:1, with a preferred range of from 0.5:1 to 6:1, more preferably from about 1:1 to 4:1.

Any water dispersible aldehyde can be utilized in the practice of the present invention. Thus, suitable aldehydes can be selected from the group consisting of aliphatic monoaldehydes, aromatic monoaldehydes, aliphatic dialdehydes, and aromatic dialdehydes. Preferred aldehydes can be selected from the group consisting of formaldehyde, paraformaldehyde, acetaldehyde, propionaldehyde, butyraldehyde, isobutyraldehyde, valeraldehyde, heptaldehyde, decanal, glyoxal; glutaradehyde, terephthaldehyde, or mixtures thereof.

As used in this application, the term phenolic compound refers to compounds represented by the formula:

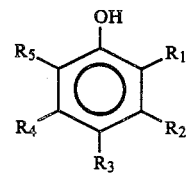

wherein $R_1$, $R_2$, $R_3$, $R_4$ and $R_5$ are independently selected from the group consisting of hydroxyl groups, amines containing from 0 to 6 carbon atoms, alkoxy groups containing from 1 to 6 carbon atoms; $NHCOCH_3$, alkyl groups containing from 1 to 6 carbon atoms, a phenyl group, $NO_2$, COOH, COH, sulfonic acids, ketones containing from 1 to 6 carbon atoms, F, Cl, Br, I and hydrogen; provided that at least 2 of the above R groups are hydrogen and the resulting compound is water dispersible.

Another group of compounds included within the term phenolic compound are the flavotannins. Flavotannins are polyphenolic materials which are extracted from the bark and wood of trees. Querbracho is an example of a suitable flavotannin.

Representative examples of suitable phenolic compounds can be selected from the group consisting of monohydroxy phenols, polyhydroxy phenols, monohydroxy napthols, polyhydroxy naphthols, o-cresol, m-cresol, p-cresol, o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-nitrophenol, m-nitrophenol, p-nitrophenol, flavotannins, phenol, resorcinol, catechol, hydroquinone, phloroglucinol, pyrogallol, 1,3-dihydroxynaphthalene, o-aminophenol, p-aminophenol, m-aminophenol, o-methylaminophenol, p-methylaminophenol, m-methylaminophenol, o-methoxyphenol, p-methoxyphenol, m-methoxyphenol, o-N-acetamidophenol, p-N-acetamidophenol, m-N-acetamidophenol, o-hydroxybenzoic acid, p-hydroxybenzoic acid, m-hydroxybenzoic acid, o-phenolsulfonic acid, p-phenosulfonic acid, m-phenolsulfonic acid, dichlorophenols, 4,4-biphenol or mixtures thereof.

Presently preferred phenolic compounds are those selected from the group consisting of phenol, resorcinol, catechol, hydroquinone, phloroglucinol, pyrogallol, 4,4'-biphenol, 1,3-dihydroxynaphthalene, or mixtures thereof.

The key to the practice of the present invention is to effect gelling of the water soluble polymer in the presence of the metal ion. The metal ion delays the rate at which the aldehyde and the phenolic compound crosslink the composition to form a gel of the water soluble polymer. In addition, the presence of the metal ion also serves to produce a stronger gel.

Suitable metal ions for the practice of the present invention can be selected from the group consisting of $Fe^{+3}$, $Fe^{+2}$, $Cu^{+2}$, $Co^{+3}$, $Ni^{+2}$, $Sn^{+4}$, $Ti^{+4}$, $Zn^{+2}$, $V^{+3}$, and $Zr^{+4}$.

The anion associated with the metal ion is not critical to the practice of the present invention, provided that the resulting compound is water soluble. Thus, suitable anions associated with the metal ion can be selected from the group consisting of chlorides, bromides, iodides, fluorides, sulfates, nitrates, phosphates and carboxylates of from 1 to 4 carbon atoms.

The constituents of the present invention should be present in the following quantities:

|  | Broad Range Wt % | Preferred Range Wt % |
| --- | --- | --- |
| water soluble polymers | 0.1–5 | 0.3–2 |
| aldehyde | .03–1.2 | 0.04–1 |
| phenolic compound | .01–2 | .04–1 |
| metal ion | .004–about 0.049 | .008–.03 |
| water | 92–99.9 | 96–99.6 |

It is critical that the concentration of metal ion be kept below 0.05 weight percent. Concentrations above 0.05 weight percent promote overcrosslinking and result in syneresis of the gel.

The delay in crosslinking is accomplished by merely incorporating an appropriate metal ion onto an aqueous solution containing water soluble polymer, aldehyde, phenolic compound and water. The order in which the constituents are mixed is not critical to the practice of the present invention, however, the metal ion must be added before the aldehyde and phenolic crosslinking agent has had an opportunity to gel the water soluble polymer.

The use of gelled polymers to alter the water permeability of underground formations is well known to those skilled in the art. Generally, an aqueous solution containing the polymer and a crosslinking agent is pumped into the formation so that it can diffuse into the more water soluble portions of the formation and alter that water permeability by gelling therein.

The present invention can be used in a similar manner. An aqueous solution containing the water soluble polymer, aldehyde, phenolic compound, and metal ion is pumped into the formation so that it alters the water permeability of the formation in a similar manner when gelation takes place. The present invention's advantage lies in the fact that since the gelation of the polymer is delayed, the polymer has an opportunity to travel farther into the formation and effect the water permeability of portions of the formation that would normally go untreated due to their distance from the injection site. In addition, the resulting gel exhibits improved strength.

The nature of the underground formation treated is not critical to the practice of the present invention. The metal ion will delay the gelation of the water soluble polymers in fresh water, salt water, or brines, as well as at a temperature range of from 70° F. to 400° F.

The following specific examples are intended to illustrate the advantages of this invention, but are not intended to unduly limit this invention.

EXAMPLE I

The purpose of this example is to demonstrate how the incorporation of a metal ion, into a solution of water soluble polymers will delay the rate at which the polymer is gelled by an aldehyde and a phenolic compound.

A one percent solution of a terpolymer composed of 30 wt % of N-vinyl-2-pyrrolidone, 15 wt % of acrylamide, and 55 wt % of sodium 2-acrylamindo-2-methylpropane sulfonate was prepared in the following manner. 16.66 grams of an inverse emulsion which contained 32.4% of the above-described active terpolymer was mixed with 483.34 ml of synthetic sea water.

The synthetic sea water used had the following formula:

| $NaHCO_3$ | 3.69 grams |
| --- | --- |
| $Na_2SO_4$ | 77.19 grams |
| NaCl | 429.00 grams |
| $CaCl_2.2H_2O$ | 29.58 grams |
| $MgCl_2.6H_2O$ | 193.92 grams |
| distilled $H_2O$ | q.s. to 18 liters |

A solution containing 26 weight percent of phenol and 26 weight percent of formaldehyde was prepared by mixing 12.1 cc of a solution containing 88 weight percent phenol with 27.9 cc of a solution containing 37 percent formaldehyde.

A solution containing 1 weight percent of ferric ion was prepared by mixing 4.827 grams of $FeCl_3.6H_2O$ was sufficient distilled water to form 100 ml of solution.

20 cc of the solution, containing 1 percent of the terpolymer was placed in a 2.3 cm×22.5 cm long ampule. 0.076 ml of the solution containing phenol and formaldehyde was also placed in the ampule.

Four other identical ampules were prepared in an identical manner except that varying quantities of ferric ion were added to the ampules.

The five ampules were sealed under nitrogen and then placed in an oven and heated to 250° F. Periodically, the ampules were removed from the oven and it was visually determined whether the polymers had formed a gel.

The following results were obtained.

TABLE I

| Ampule # | Iron Conc (ppm) | Iron Conc (wt %) | Gelation Period |
| --- | --- | --- | --- |
| 1 | 0 | 0 | 1.8 days |
| 2 | 40 | 0.004 | 13 days |
| 3 | 80 | 0.008 | 16 days |
| 4 | 120 | 0.012 | 13 days |
| 5 | 200 | 0.020 | 13 days |

The above data demonstrates that the incorporation of a transition metal ion into a solution of water soluble polymers delays the rate at which the polymer is gelled by an aldehyde and a phenolic compound.

EXAMPLE II

The purpose of this example is to demonstrate that gelling water soluble polymers in the presence of a metal ion increases the mechanical strength of the gel.

The five ampules of the previous example were aged in a 250° F. oven for 34 days. At the end of the 34 days, they were removed from the oven, and the mechanical strength of the gel was determined.

This was determined in the following manner. The ampule was laid horizontally along a graduated scale and the spreading of the gel was measured. If the gel was weak, then it would spread along the entire length of the tube. Likewise, as the strength of the gel increased, the distance the gel spread decreased.

This relationship can be expressed mathematically as $(A1-T1)\times 100/A1$; where A1 equals the ampule length, T1 equals the tongue length of the gel measured in centimeters from the point at which the gel contacts the entire circumference of the tube to the farthest point that the gel has spread. Thus, the strongest gels would have a gel strength of 100%, whereas the weakest gels would have a gel strength of 0.

The following results were obtained.

TABLE II

| Ampule # | Iron Conc (in ppm) | Iron Conc (wt %) | Tongue Length | Gel Strength % |
|---|---|---|---|---|
| 1 | 0 | 0 | 1.2 | 94 |
| 2 | 40 | 0.004 | 0.3 | 98 |
| 3 | 80 | 0.008 | 0.2 | 99 |
| 4 | 120 | 0.012 | 0.0 | 100 |
| 5 | 200 | 0.020 | 0.0 | 100 |

The above data demonstrates that gelling water soluble polymers in the presence of a metal ion increases the mechanical strength of the gel.

EXAMPLE III

The purpose of this example is to demonstrate that other metal ions besides iron, will delay the rate at which water soluble polymers are gelled by an aldehyde and a phenolic compound.

One ampule containing no transition metal ions was prepared in a manner identical to that in Example I. Six other ampules were also prepared in an identical manner to those in Example I except that other metals were added to the tube to the ampules rather than iron.

The following results were obtained.

TABLE III

| Ampule # | Metal Ion | Conc of Metal Ion in ppm | Conc of Metal Ion in wt % | Gelation Period |
|---|---|---|---|---|
| 1 | None | — | 0 | 18.7 hrs. |
| 2 | $Fe^{+2}$ | 150 | 0.15 | 7.8 days |
| 3 | $Zn^{+2}$ | 150 | 0.15 | 2.8 days |
| 4 | $Ni^{+2}$ | 150 | 0.15 | 19 days |
| 5 | $Cu^{+2}$ | 150 | 0.15 | 7.8 days |
| 6 | $Zr^{+4}$ | 150 | 0.15 | 2.8 days |

The above data shows that these other metal ions also delay the rate at which water soluble polymers are gelled by aldehydes and phenolic compounds.

EXAMPLE IV

The purpose of this example is to demonstrate that other transition metal ions will also increase the strength of water soluble polymer gels.

The ampules prepared in Example III were aged for 65 days in a 250° F. oven. At the end of this period, they were removed from the oven and the mechanical strength of the gels were determined in a manner identical to that in Example II. The following results were obtained.

TABLE IV

| Ampule | Metal Ion | Conc of Metal Ion in ppm | Conc of Metal Ion in wt % | Tongue Length | Gel Strength |
|---|---|---|---|---|---|
| 1 | None | 0 | 0 | 10.3 | 54 |
| 2 | $Fe^{+2}$ | 150 | 0.15 | 0 | 100 |
| 3 | $Zn^{+2}$ | 150 | 0.15 | 3.0 | 85 |
| 4 | $Ni^{+2}$ | 150 | 0.15 | 0 | 100 |
| 5 | $Cu^{+2}$ | 150 | 0.15 | 0.7 | 96 |
| 6 | $Zr^{+4}$ | 150 | 0.15 | 0 | 100 |

The above data demonstrates that zinc, nickel, cobalt, copper, and zirconium will also increase the strength of water soluble polymer gels.

EXAMPLE V

The purpose of this example is to demonstrate that a metal ion will also delay the rate at which a water soluble copolymer composed of acrylamide and N-vinyl-2-pyrrolidone is gelled by an aldehyde and a phenolic compound.

A 0.5 weight percent solution of a copolymer composed of 50 wt % acrylamide and 50 wt % of N-vinyl-2-pyrrolidone was prepared in the following manner. 16.67 grams of a gel-log, containing 30 wt % of the above-described copolymer was dissolved in 983.33 grams of water. The solution was stirred overnight to insure total hydration of the polymer.

A solution containing 3.3 wt % of a ferric ion was prepared by mixing 8.0 grams of $FeCl_3.6H_2O$ with 50 ml of water.

A solution containing 26 wt % of phenol and 26 wt % of formaldehyde was prepared in a manner identical to that in Example I.

The solution containing the copolymer was subdivided into five separate 200 ml samples.

Varying quantities of the phenol-formaldehyde solution was added to four of the above-described 200 ml samples of copolymer.

Four test samples were prepared by placing 20 cc from each of the above polymer-phenol-formaldehyde solutions into separate 2.3 cm×22.5 cm long ampules.

Four more identical test samples were prepared, except that 0.125 ml of the ferric ion solution were placed in each ampule resulting in a final concentrate of 0.02 wt % iron.

The eight ampules were sealed under nitrogen and then placed in an oven and heated to 200° F. Periodically, the ampules were removed from the oven and it was visually determined whether the polymers had formed a gel.

The following results were obtained.

TABLE V

| Ampule # | Iron Conc (wt %) | Phenol Conc (wt %) | Formaldehyde Conc (wt %) | Gelation Period |
|---|---|---|---|---|
| 1 | 0 | 0.05 | 0.05 | 7 days |
| 2 | 0 | 0.1 | 0.1 | 7 days |
| 3 | 0 | 0.25 | 0.25 | 2 days |
| 4 | 0 | 0.50 | 0.5 | 1 day |
| 5 | 0.02 | 0.05 | 0.05 | 96 days |
| 6 | 0.02 | 0.1 | 0.1 | 96 days |
| 7 | 0.02 | 0.25 | 0.25 | 25 days |
| 8 | 0.02 | 0.5 | 0.5 | 2 days |

The above data demonstrates that a metal ion will delay the rate at which an aldehyde and a phenolic compound will gel the water soluble polymers of the present invention.

Reasonable variations can be made in view of the following disclosure without departing from the spirit and scope of the invention.

What is claimed is:

1. In an enhanced oil recovery process wherein the water permeability of selected portions of an underground formation is decreased by injecting a gelable composition containing;

from 0.1–5 wt % of a water soluble polymer wherein said water soluble polymer contains from 5 to 100 mole percent of a monomer selected from those monomers represented by the following formula

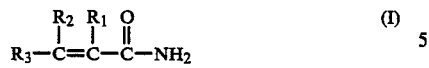  (I)

wherein $R_1$, $R_2$, and $R_3$ are selected from the group consisting of hydrogen of alkyl groups containing from 1 to 3 carbon atoms; and from 0 to 95 mole percent of a monomer selected from the group consisting of;
(A) those monomers which can be represented by the formula

  (II)

wherein R is selected from the group consisting of hydrogen or alkyl radicals containing from 1 to 6 carbon atoms, R' is selected from the group consisting of alkylene radicals containing from 1 to 6 carbon atoms or an arylene radical containing from 6 to 10 carbon atoms, and M is selected from the group consisting of hydrogen, ammonium, potassium, or sodium,
(B) those monomers represented by the following formula,

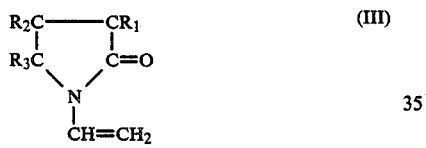  (III)

where $R_1$, $R_2$ and $R_3$ are independently selected from the group consisting of hydrogen or alkyl radicals containing from 1 to 2 carbon atoms; and
(C) those monomers selected from the group consisting of acrylic acid, methacrylic acid, vinylsulfonic acid, vinylbenzylsulfonic acid, vinylbenzenesulfonic acid, vinyl acetate, arylonitrile, methyl acrylonitrile, vinyl alkyl ether, vinyl chloride, maleic anhydride, vinyl substituted cationic quaternary ammonium compounds (acryloyloxyethyl)dimethylmethylammonium methyl sulfate, sodium acrylate; and
(D) mixtures thereof;
from 0.03–1.2 wt % of a water dispersible aldehyde;
from 0.01–2 wt % of a phenolic compound; and
from 92–99.9 wt % of water;
the improvement which comprises:
pumping into an underground formation, prior to gelling, said gelable composition containing said water soluble polymer, said water dispersible aldehyde, said phenolic compound, water, and a metal ion selected from the group consisting of $Fe^{2+}$, $Fe^{3+}$, $Cu^{2+}$, $Co^{3+}$, $Ni^{2+}$, $Sn^{4+}$, $Ti^{4+}$, $Zn^{2+}$, $V_{3+}$, and $Zr^{4+}$, wherein said metal ion is present in an amount sufficient to delay the gelling of said gelable composition, in a manner which facilitates the contacting of said water soluble polymer, said water dispersible aldehyde, said phenolic compound, water, and said metal ion thereby delaying the gelling of said gelable composition.

2. The process of claim 1 wherein
said water soluble polymer is selected from the group consisting of homopolymers of acrylamide, homopolymers of methacrylamide, copolymers of acrylamide and acrylic acid, copolymers of acrylamide and sodium acrylate, copolymers of acrylamide and sodium acrylate, copolymers of acrylamide and N-vinyl-2-pyrrolidone, copolymers of acrylamide and sodium 2-acrylamido-2-methylpropane sulfonate, and terpolymers of N-vinyl-2-pyrrolidone, acrylamide, and sodium 2-acrylamido-2-methylpropane sulfonate;
said aldehyde is selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, or mixtures thereof; and
said phenolic compound is selected from the group consisting of those phenols represented by the formula:

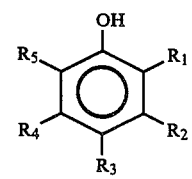

wherein $R_1$, $R_2$, $R_3$, $R_4$ and $R_5$ are independently selected from the group consisting of hydroxyl groups, amines containing from 0 to 6 carbon atoms, alkoxy groups containing from 1 to 6 carbon atoms; $NHCOCH_3$, alkyl groups containing from 1 to 6 carbon atoms, a phenyl group, $NO_2$, COOH, COH, sulfonic acids, ketones containing from 1 to 6 carbon atoms, F, Cl, Br, I and hydrogen; provided that at least 2 of the above R groups are hydrogen and the resulting compound is water dispersible.

3. The process of claim 1 wherein said phenolic compound is selected from the group consisting of phenol, resorcinol, catechol, hydroquinone, phloroglucinol, pyrogallol, 4,4-biphenol, 1,3-dihydroxynaphthalene, or mixtures thereof.

4. The process of claim 1 wherein
said water soluble polymer is present in the range of from 0.3–2 wt %;
said water dispersible aldehyde is present in the quantity of from 0.04–1 wt %;
said phenolic compound is present in the quantity of from 0.04–1 wt %;
said water is present in the quantity of from 96–99.6 wt %; and
said metal ion is present in the quantity of from 0.008–0.03 wt %.

5. The process of claim 1 wherein
said water soluble polymer is a terpolymer of N-vinyl-2-pyrrolidone, acrylamide, and sodium 2-acrylamido-2-methylpropane sulfonate;
said water dispersible aldehyde is formaldehyde;
said phenolic compound is phenol; and
said metal ion is $Fe^{2+}$.

6. The process of claim 1 wherein said water soluble polymer is a terpolymer of N-vinyl-2-pyrrolidone, acrylamide, and sodium 2-acrylamido-2-methylpropane sulfonate;
said water dispersible aldehyde is formaldehyde;
said phenolic compound is phenol; and
said metal ion is $Zn^{2+}$.

7. The process of claim 1 wherein
said water soluble polymer is a terpolymer of N-vinyl-2-pyrrolidone, acrylamide, and sodium 2-acrylamido-2-methylpropane sulfonate;
said water dispersible aldehyde is formaldehyde;
said phenolic compound is phenol; and
said metal ion is $Ni^{2+}$.

8. The process of claim 1 wherein
said water soluble polymer is a terpolymer of N-vinyl-2-pyrrolidone, acrylamide, and sodium 2-acrylamido-2-methylpropane sulfonate;
said water dispersible aldehyde is formaldehyde;
said phenolic compound is phenol; and
said metal ion is $Cu^{2+}$.

9. The process of claim 1 wherein
said water soluble polymer is a terpolymer of N-vinyl-2-pyrrolidone, acrylamide, and sodium 2-acrylamido-2-methylpropane sulfonate;
said water dispersible aldehyde is formaldehyde;
said phenolic compound is phenol; and
said metal ion is $Zr^{4+}$.

10. The process of claim 1 wherein
said water soluble polymer is a copolymer of N-vinyl-2-pyrrolidone and acrylamide;
said water dispersible aldehyde is formaldehyde;
said phenolic compound is phenol; and
said metal ion is $Fe^{3+}$.

* * * * *